United States Patent [19]

Holling

[11] Patent Number: 5,064,998
[45] Date of Patent: Nov. 12, 1991

[54] RELAY CONTROL APPARATUS
[75] Inventor: Ronald W. Holling, St. Joseph, Mich.
[73] Assignee: Whirlpool Corporation, Benton Harbor, Mich.
[21] Appl. No.: 477,612
[22] Filed: Feb. 9, 1990

Related U.S. Application Data
[62] Division of Ser. No. 228,339, Aug. 4, 1988.

[51] Int. Cl.[5] .............................................. H05B 1/02
[52] U.S. Cl. .................................... 219/519; 219/494; 219/509; 219/493; 219/501; 361/3; 361/94; 340/644
[58] Field of Search .............. 219/519, 509, 518, 493, 219/483–486, 501, 494, 492; 361/1–5, 174, 37, 92, 94, 96, 97; 340/628, 626, 644

[56] References Cited

U.S. PATENT DOCUMENTS

| | | | |
|---|---|---|---|
| 3,887,915 | 6/1975 | Olsen et al. | 361/78 |
| 4,369,364 | 1/1983 | Kuntermann | 361/1 |
| 4,685,018 | 8/1987 | Tada et al. | 361/1 |
| 4,709,291 | 11/1987 | Eggert et al. | 361/2 |
| 4,791,518 | 12/1988 | Fischer | 361/2 |
| 4,878,144 | 10/1989 | Nebon | 361/5 |

FOREIGN PATENT DOCUMENTS

| | | | |
|---|---|---|---|
| 0197778 | 10/1986 | European Pat. Off. | 361/2 |
| 0930490 | 5/1982 | U.S.S.R. | 361/2 |

*Primary Examiner*—Mark H. Paschall
*Attorney, Agent, or Firm*—Thomas J. Roth; Stephen D. Krefman; Thomas E. Turcotte

[57] ABSTRACT

A relay control for a cooking appliance having a heating element includes a sensor for detecting the occurrence of an arc upon a change of state of a relay coupled between the heating element and a power supply. Upon detecting an arc, the sensor provides a timing signal which is coupled to a microprocessor that controls the energization and deenergization of the relay. The microprocessor is responsive to the timing signal from the sensor to determine the time delay between the last energization/deenergization of the relay and the changing of the relay's state. From the time delay, the microprocessor determines a delay constant. Subsequently, the microprocessor energizes the relay at a time after the detection of a zero crossover point of the power supply signal, wherein the time is equal to the determined delay constant to cause the relay to change state at or slightly before a zero crossover point of the power supply signal. The sensor may take the form of an optical sensor mounted inside the housing of the relay or outside of the housing. Alternatively, the sensor may include an electromagnetic or RF pick-up coil for sensing an electromagnetic or RF signal in the radio frequency (RF) range radiated upon the generation of an arc. Alternatively, the sensor may be a vibration sensor, such as a piezoelectric transducer, capable of detecting vibrations associated with the opening or closing of the relay contacts.

12 Claims, 9 Drawing Sheets

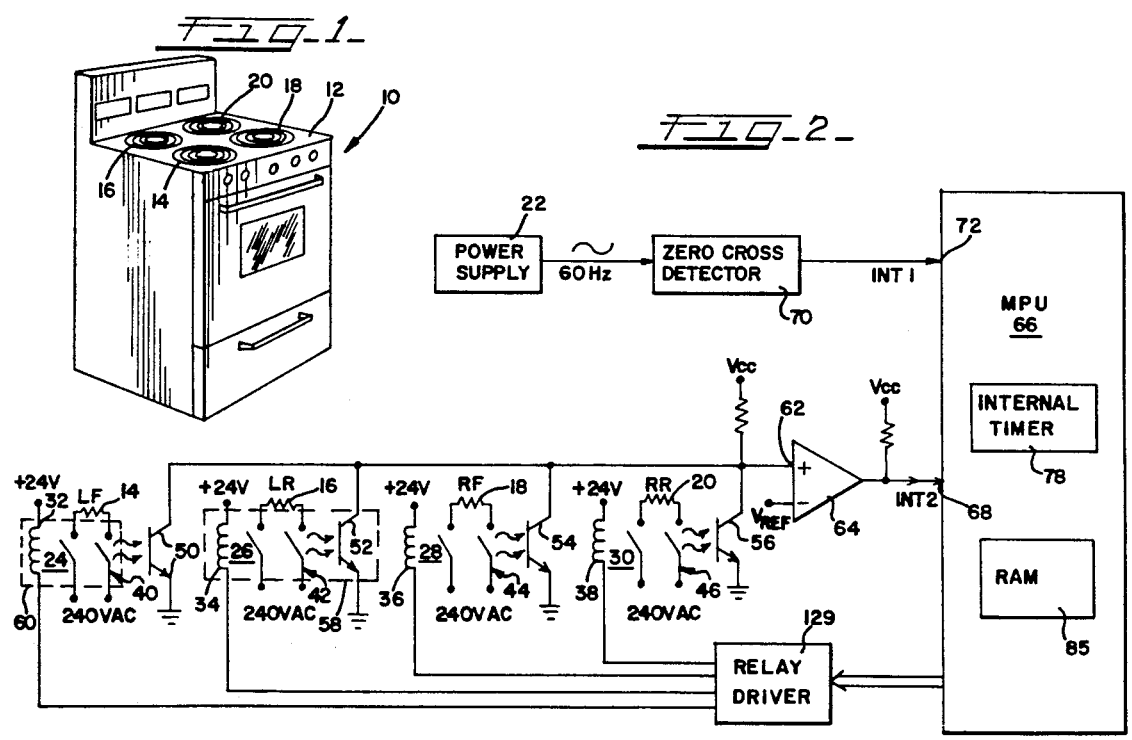

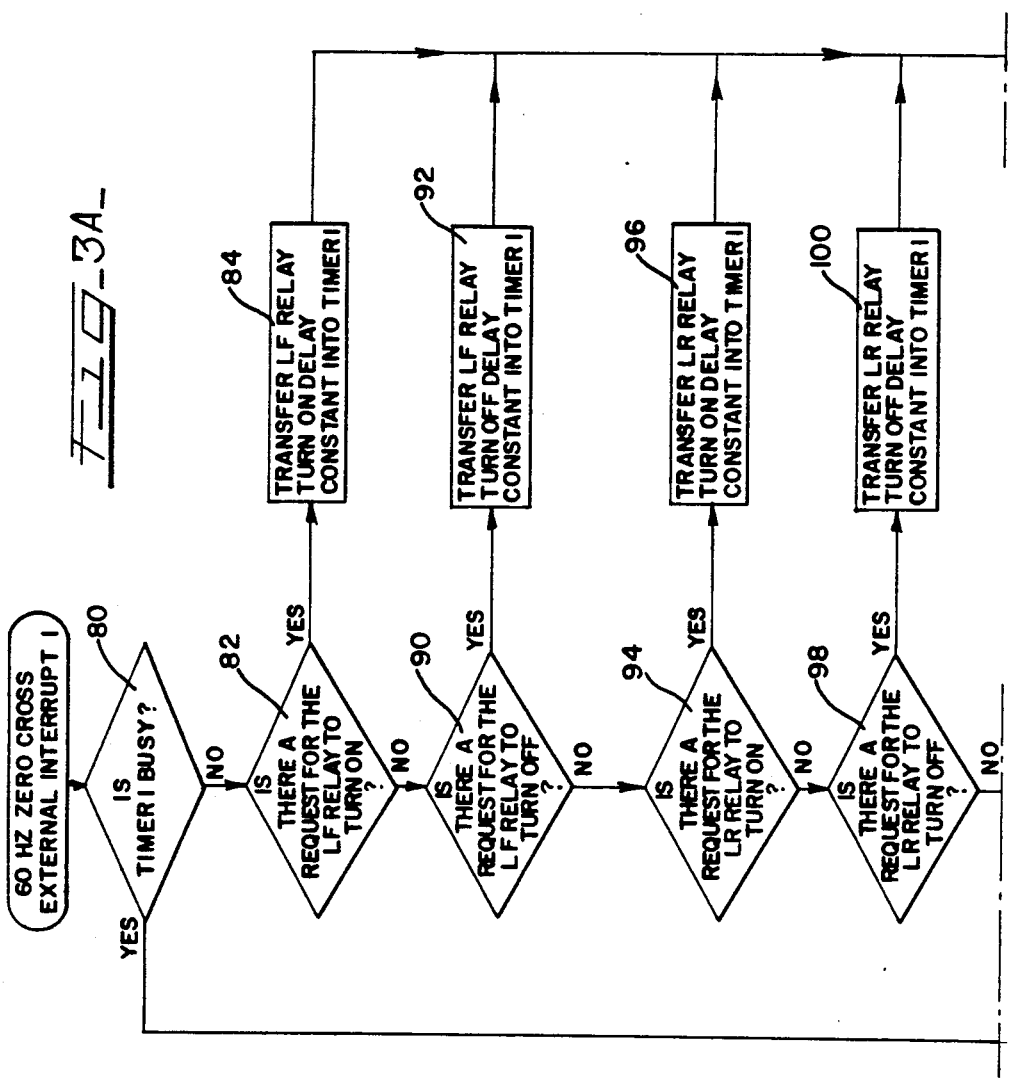

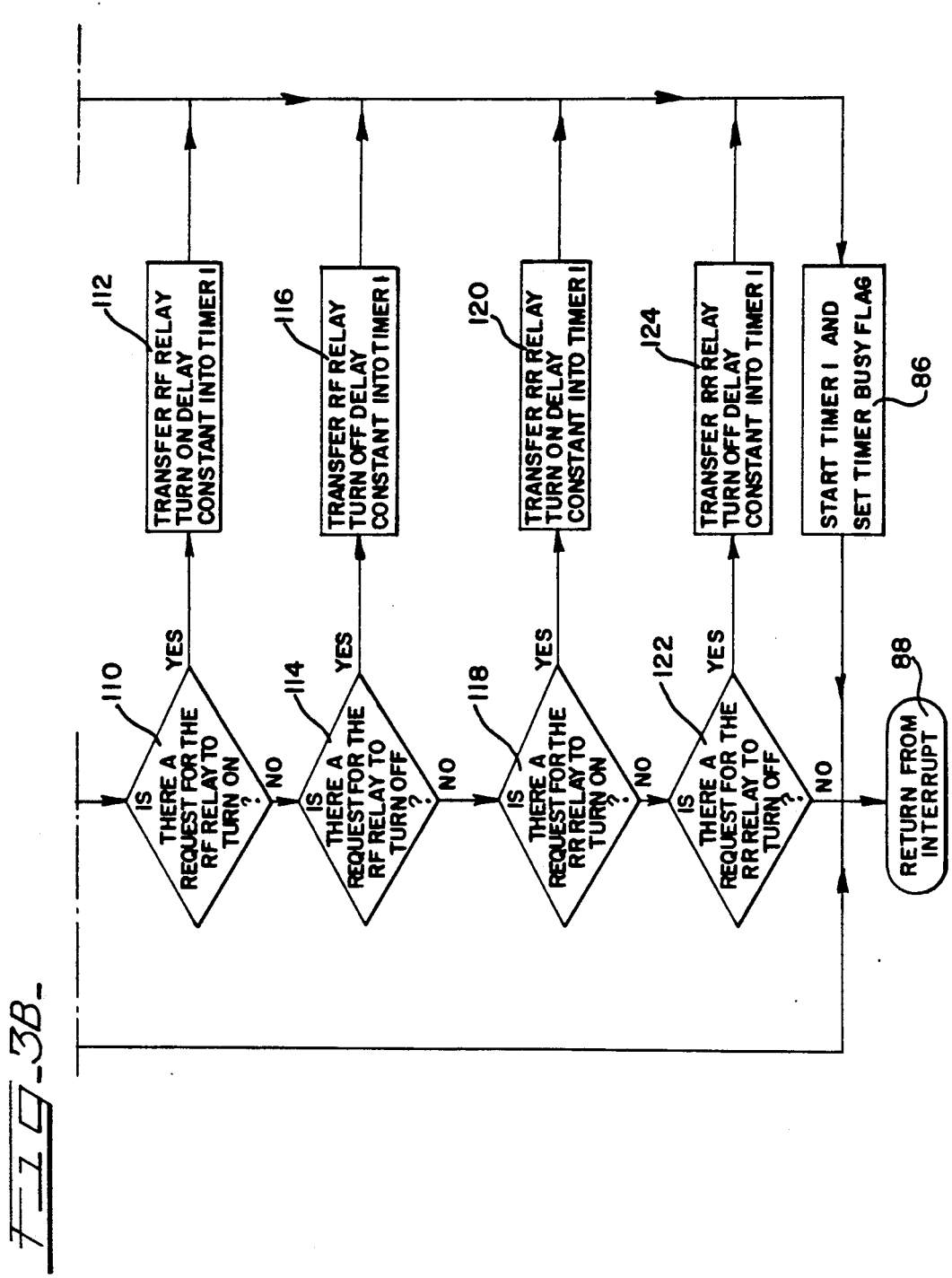

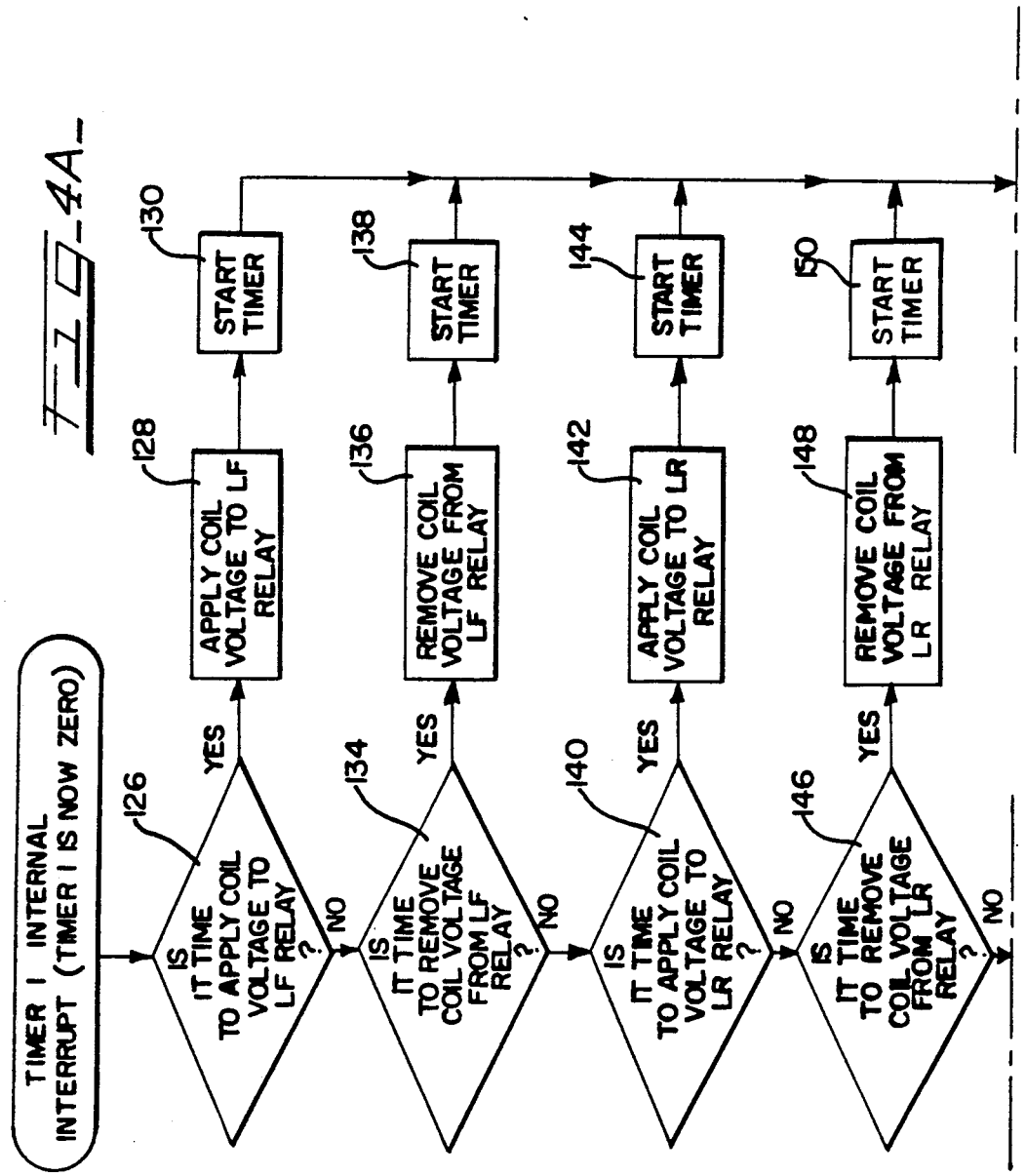

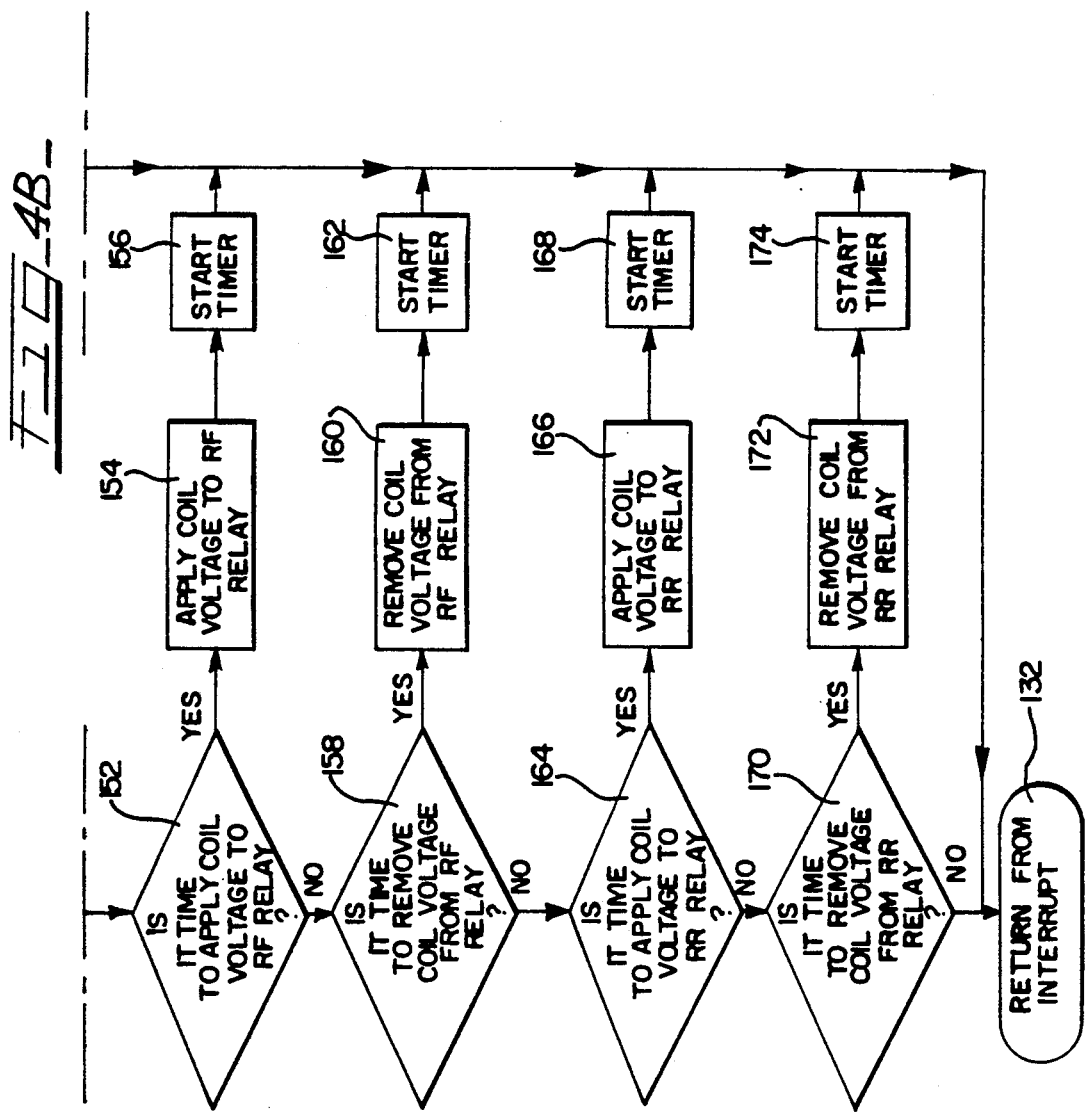

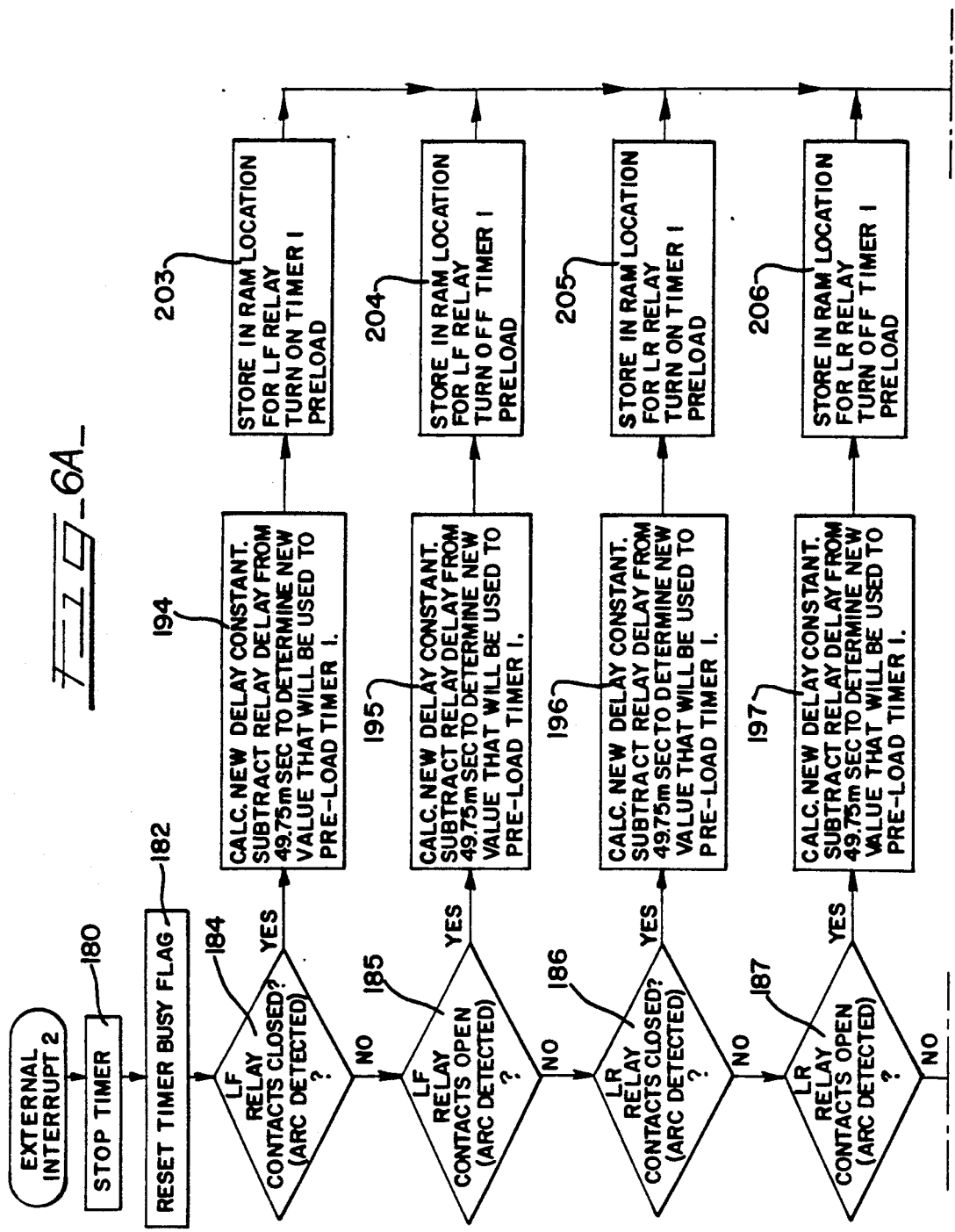

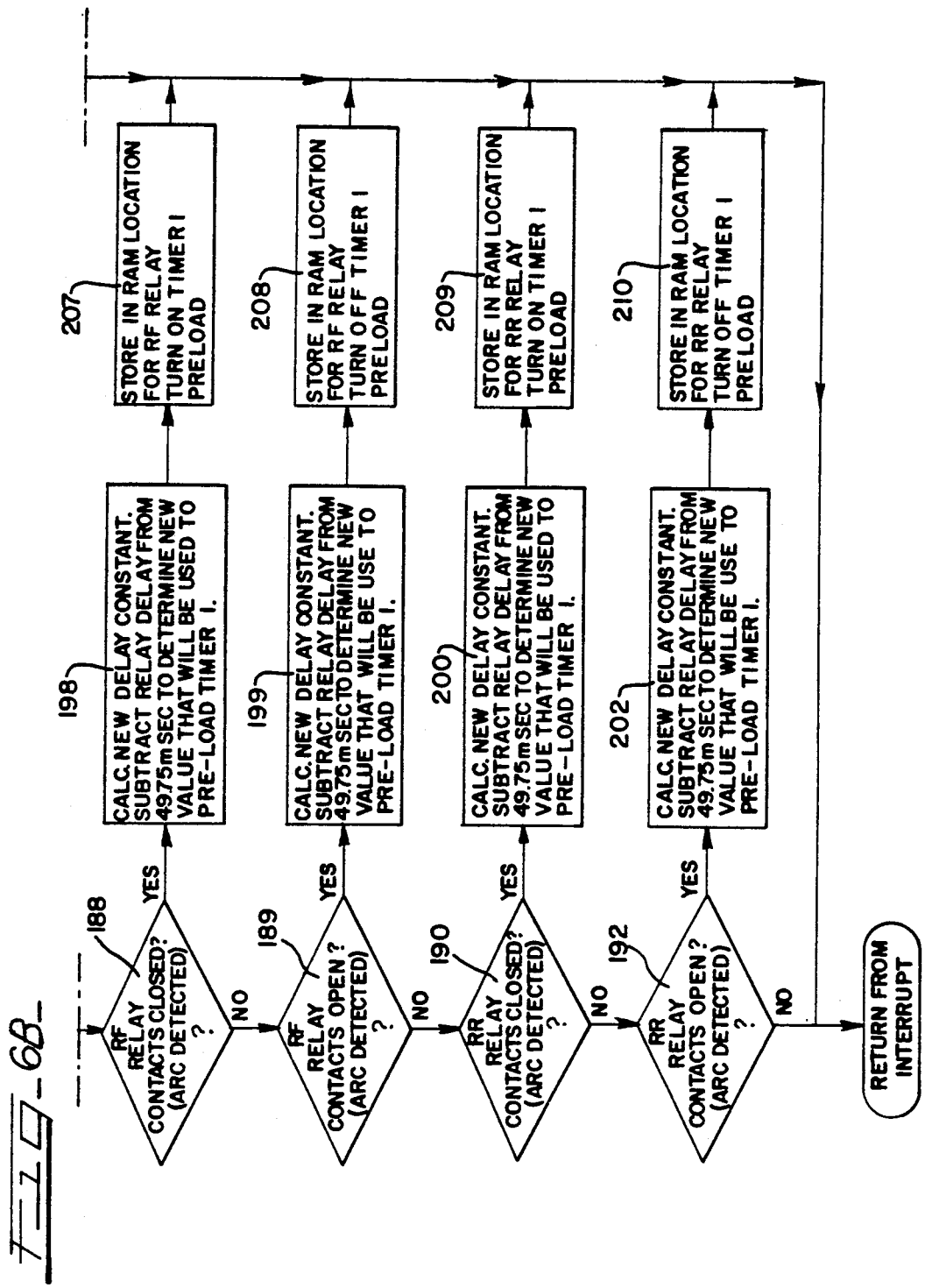

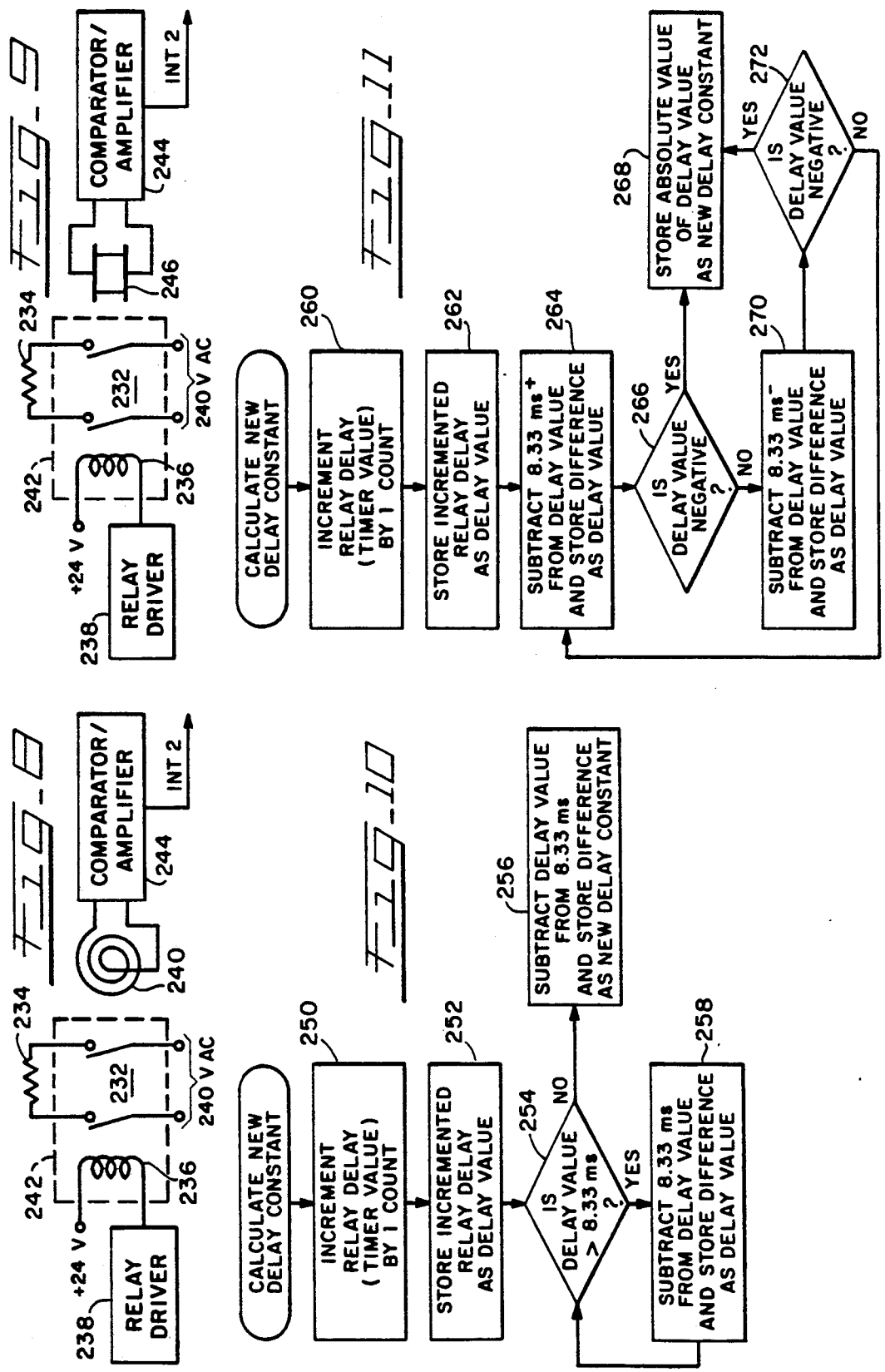

RELAY CONTROL APPARATUS

This is a division of application Ser. No. 07/228,339, filed Aug. 4, 1988 now pending.

BACKGROUND OF THE INVENTION

1. Field of the Invention

The present invention relates to a control for a relay coupling an alternating power supply signal to a load such as a resistive load and, more particularly, to a control for a relay coupling an alternating power supply to a heating element of a cooking appliance, the control including a sensing device for detecting the occurrence of an arc upon a change of state of the relay's contact assembly to control the relay to change state at or slightly before a zero crossing point of the power supply signal.

2. Description of the Prior Art

Cooking appliances such as range tops have been known to couple an alternating power supply to the heating elements of the range top through respective electromagnetic relays in order to heat the heating elements. If a range top heating element relay changes state at a point in the positive or negative half cycle of the power supply signal remote from a zero crossing, arcing typically occurs. Contact erosion due to arcing can substantially reduce the life of a heating element relay.

SUMMARY OF THE INVENTION

In accordance with the present invention, the disadvantages of prior art cooking appliances utilizing relays to couple an alternating power supply to heating elements have been overcome. The relay control of the present invention includes a sensing device for detecting the occurrence of arcing upon a change of state of the relay contact assembly. The output of the sensing device provides a timing signal used to control the relay to change state at or slightly before a zero crossing point of the power supply signal.

The sensing device employed by the present invention may include a phototransistor positioned adjacent to a two-pole electromagnetic relay that couples alternating power to a resistive load such as a heating element of a cooking appliance. Upon detecting an arc, the sensing device provides a timing signal which is coupled to a control for energizing/deenergizing the relay. The relay energization control is responsive to the timing signal from the sensing device to determine the time delay between the last energization or deenergization of the relay and the changing of the contact assembly's state. From the time delay, the relay energization control determines a delay constant. The relay energization control then energizes the relay a time period after the detection of a zero crossover point of the power supply signal wherein the time period is equal to the delay constant.

In the preferred embodiment, the delay constant is determined from the difference between a value slightly less than a multiple of the power supply signal's time period and the time delay between the energization of the relay and the changing of the contact assembly's state. A value slightly less than a multiple of the power supply signal's time period is used to calculate the delay constant in order to account for possible delays in the control and to ensure that the relay changes state at or slightly before a zero crossover point of the power supply signal. This feature guards against arcing occurring when the relay contacts open slightly after a zero crossover point, an undesirable event because of the increasing magnitude of the voltage and current after a zero crossover and the consequent extension of the arc duration.

The relay energization control of the present invention is preferably a microprocessor control wherein the outputs of the zero crossover detector and the sensing device each form an external interrupt input to the microprocessor. Although an individual sensing device may be provided for each heating element of the cooking appliance, only one interrupt input of the microprocessor is needed to monitor the outputs of all of the sensing devices according to the teachings of the present invention.

The sensing device of the present invention may be an optical sensing device such as a phototransistor or a photodiode. One alternative to an optical sensing device, however, is a sensing device that includes an electromagnetic pick-up coil that responds to an electromagnetic signal radiated when an arc occurs. A further alternative is a sensing device that includes a piezoelectric transducer that responds to vibrations that occur when the relay changes state. A relay and the sensing device monitoring the relay may be contained in a single housing. Alternatively, the relay may be contained in a housing that is transparent to or does not interfere with the detection of the particular characteristic of an arc or of the relay changing state to which the employed sensing device responds, in which case the sensing device may be mounted outside of the housing but within range thereof in order to detect the characteristic.

The relay control of the present invention substantially increases the life of the relay by minimizing arcing in an economically advantageous manner.

These and other objects, advantages and novel features of the present invention, as well as details of an illustrative embodiment thereof, will be more fully understood from the following description and the drawing.

BRIEF DESCRIPTION OF THE DRAWING

FIG. 1 is a perspective view of a cooking appliance constructed in accordance with the principles of the present invention;

FIG. 2 is a block diagram of the relay control for a cooking appliance heating element of the present invention;

FIG. 3 is a flow chart illustrating the operation of the relay control of the present invention in response to a first external interrupt;

FIG. 4 is a flow chart illustrating the operation of the relay control of the present invention in response to an internal timer interrupt;

FIG. 6 is a flow chart illustrating the operation of the relay control of the present invention in response to a second external interrupt;

FIG. 8 is a block diagram illustrating one alternative sensor;

FIG. 9 is a block diagram illustrating a second alternative sensor;

FIG. 10 is a flow chart illustrating one alternative method of calculating a delay constant; and FIG. 11 is a flow chart illustrating a second alternative method of calculating a delay constant.

DESCRIPTION OF THE PREFERRED EMBODIMENT

Figure 5:
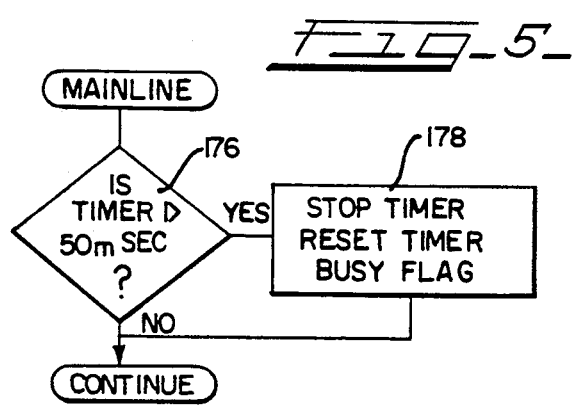
FIG. 5 is a flow chart illustrating a subroutine for monitoring the contents of an internal timer.

A cooking appliance 10, shown in FIG. 1 and constructed in accordance with the principles of the present invention, includes a range top 12 with four electric heating elements, a left front heating element 14, a left rear heating element 16, a right front heating element 18 and a right rear heating element 20. In order to vary the amount of heat generated by a heating element, the duty cycle of the heating element is varied. For example, at its highest heat setting, a heating element might be continuously on. However, at an intermediate heat setting, the heating element cycles on and off.

As shown in FIG. 2, each of the heating elements 14, 16, 18 and 20 is coupled to a 240 V A.C. power supply 22 through a respective electromagnetic double-pole relay 24, 26, 28 and 30 that is controlled to close in order to apply power to the heating element coupled thereto and to open in order to remove power from the heating element. Each relay 24, 26, 28 and 30 has a respective coil 32, 34, 36 and 38 as well as a respective contact assembly 40, 42, 44 and 46 with two poles. When a voltage is applied to a coil 32, 34, 36 and 38 of a relay 24, 26, 28 and 30, the poles of the respective contact assembly 40, 42, 44 and 46 close; whereas, when the voltage is removed from the coils 32, 34, 36 and 38, the poles of the respective contact assembly 40, 42, 44 and 46 open.

Phototransistors 50, 52, 54 and 56 are positioned within optical range of the respective relays 24, 26, 28 and 30 to sense arcing when a relay changes state. A phototransistor may be within optical range of a relay even though the phototransistor is located remote therefrom by optically coupling the phototransistor and the relay by mirrors, fiber optics and the like so that the phototransistor is able to detect arcing. Each of the phototransistors 50, 52, 54 and 56 may be mounted with its respective relay 24, 26, 28 and 30 in the same housing as depicted for the relay 26, phototransistor 52 and housing 58. Alternatively, each of the relays 24, 26, 28 and 30 may be mounted in a housing that is transparent to the wavelength of the arc wherein the respective phototransistors 50, 52, 54 and 56 are mounted outside of the housing but within optical range thereof in order to sense arcing as depicted for the relay 24, transparent housing 60 and phototransistor 50. It is noted that the other sensors such as an electromagnetic or RF pickup or a piezoelectric transducer, as discussed in detail below with reference to FIGS. 8 and 9, or other optical sensors such as photodiode could be used to detect arcing. It is further noted that a single sensor could be used to detect arcing of all four relays 24, 26, 28 and 30 if the arc were coupled to the sensor by, for example, mirrors, fiber optics or the like for an optical sensor.

The phototransistors 50, 52, 54 and 56 are connected in parallel between $+V_{CC}$ and ground, wherein the collectors of each of the phototransistors are tied to the noninverting input terminal 62 of an operational amplifier 64, the inverting input terminal 65 of which is coupled to a reference voltage, $V_{REF}$. The operational amplifier 64 forms a comparator, the sensitivity of which is determined by the reference, $V_{REF}$. The reference voltage, $V_{REF}$, is selected to enable the comparator 64 to distinguish between an arc and noise, such as ambient light. When an arc occurs upon the changing of the state of one of the relays 24, 26, 28 or 30, the phototransistor 50, 52, 54 or 56 associated with the relay conducts causing the collector voltage of the phototransistor to drop. Upon sensing a voltage drop at the noninverting input terminal 62, the comparator 64 outputs an interrupt, INT 2, to a microprocessor control unit 66. An external interrupt INT 2 at an input 68 of the microprocessor 66 identifies the occurrence of an arc. Because the microprocessor 66 keeps track of which relay is changing state, as discussed in detail below, the external interrupt, INT 2, need only signal the occurrence of an arc, the microprocessor 66 attributing the arc to the relay changing state. This enables the phototransistors 50, 52, 54 and 56 to be connected in parallel to the operational amplifier 64 so that only one interrupt input of the microprocessor 66 is used.

The microprocessor 66 is responsive to an external interrupt INT 1 to control the relays 24, 26, 28 and 30 so that they change state upon a voltage or current zero crossover point of the power supply signal output from the power supply 22. The power supply signal from the power supply 22 is a 60 Hz signal. The zero crossover points of the power supply signal are sensed by a zero crossover detector 70 the output of which is coupled to an external interrupt input 72 of the microprocessor 66. In the preferred embodiment, the zero crossover detector 70 detects only one zero crossover point per cycle of the power supply signal such as the zero crossover point leading from a negative half cycle of the 60 Hz power supply signal to a positive half cycle of the signal. When such a crossover point is detected by zero crossover detector 70, the detector 70 generates an external interrupt, INT 1, coupled to the microprocessor 66.

More specifically, the microprocessor 66 is responsive to an external interrupt INT 2 to determine the time delay between the last energization of the relay and the changing of the state of that relay's contact assembly, wherein the determined time delay represents the inertia of the relay. From the time delay, the microproccessor 66 determines a delay constant. The next time the state of the relay is to be changed, the microprocessor is responsive to an external interrupt INT 1 identifying a zero crossover point of the power supply signal to energize or deenergize the relay a time period thereafter, the time period being equal to the delay constant. The microprocessor 66 delays the energization/deenergization of the relay to compensate for the time required to open or close the relay's contacts after power is removed therefrom or applied thereto (hereinafter referred to as the relay's "inertia") so as to cause the relay to change state at or slightly before a zero crossover point of the power supply signal as discussed in detail below.

As shown in FIG. 3, upon receipt of an interrupt INT 1 identifying a negative-to-positive zero crossover point leading to a positive half cycle of the power supply signal, the microprocessor 66 determines at block 80 whether an internal timer 78 is busy. If not, at block 82 the microprocessor 66 determines whether there is a request for the left front relay 24 to turn on. If there is, at block 84 the microprocessor 66 transfers the left front relay turn on delay constant, calculated as discussed below, from RAM 85 to the timer 78. The microprocessor 66 then proceeds to block 86 and starts the timer 78 counting up. At block 86, the microprocessor 66 sets a busy flag for the timer 78 and thereafter at block 88 returns from the interrupt.

If it is determined at block 82 that there is not a request for the left front relay 24 to turn on, the microprocessor 66 at block 90 determines whether there is a request for the left front relay 24 to turn off. If there is, the microprocessor 66 at block 92 transfers the left front relay turn off delay constant stored in the RAM 85 to the timer 78. The microprocessor 66 then proceeds to block 86 to start the timer 78 and to set the timer busy flag.

If there is no request to turn the left front relay 24 on or off, the microprocessor 66 at blocks 94 and 98 determines whether there is a request to turn the left rear relay 26 on or off. If there is no such request, the microprocessor 66 at blocks 110 and 114 determines whether there is a request to turn the right front relay 28 on or off and if not, the microprocessor at blocks 118 and 122 determines whether there is a request to turn the right rear relay 30 on or off. If there is a request for the left rear relay, right front relay, or right rear relay to turn on as determined by respective blocks 94, 110 and 118 the microprocessor 66, at respective blocks 96, 112, and 120, transfers the relay turn on delay constant associated with that relay from the RAM 85 to the timer 78. The microprocessor 66 then proceeds to block 86 to start the timer 78 and to set the timer busy flag. Similarly, if there is a request for the left rear relay 26, right front relay 28 or right rear relay 30 to turn off as determined by the microprocessor 66 at blocks 98, 114 and 122, the microprocessor 66 transfers the respective relay turn off delay constant from the RAM 85 to the timer 78 at respective blocks 100, 116 and 124. Thereafter, the microprocessor 66 proceeds to block 86 to start the timer 78 and set the timer busy flag.

The timer 78 is a three-nibble recirculating counter which goes to zero, generating an internal timer interrupt, after counting up through FFF. When a turn on or turn off delay constant is loaded into the timer 78 at blocks 84, 92, 96, 100, 112, 116, 120 or 124, the timer 78 is preset to a respective value which will cause the timer 78 to reach zero upon counting up a number of times representating the delay constant loaded into the timer 78. This feature enables the timer 78 to perform two functions, the first of which is timing the delay between the receipt of a zero crossover point interrupt, INT 1, and the energization or de-energization of a relay. The second function of the timer 78 is to determine the inertia of the relay's contact assembly by counting the time between the energization or deenergization of the relay and the occurrence of an arc representing the time at which the contact assembly actually changes state.

When the timer 78 has counted to zero after being loaded with a delay constant for a relay so that the timer 78 generates the internal timer interrupt, the microprocessor 66, as shown in FIG. 4 at block 126, determines whether it is time to apply coil voltage to the left front relay 24. If it is time for the left front relay 24 to close, the microprocessor 66 at block 128 outputs a relay control signal to control a relay driver 129, shown in FIG. 2, to apply a coil voltage to the left front relay coil 32. Thereafter at block 130, the microprocessor 66 starts timing the time between the application of a coil voltage and the occurrence of an arc if any, the microprocessor 66 at block 132 returning from the interrupt. If the microprocessor 66 determines at block 126 that it is not time to apply coil voltage to the left front relay 24, but at block 134 determines that it is time to remove coil voltage from the left front relay 24, the microprocessor at block 136 outputs a relay control signal to control the relay driver 129 to remove coil voltage from the left front relay coil 32. Thereafter, at block 138, the microprocessor 66 starts timing. If it is not time to apply or remove coil voltage to or from the left front relay 24, the microprocessor 66 determines at blocks 140 and 146 whether it is time to apply or remove coil voltage to or from the left rear relay 26. If not, the microprocessor 66 determines at blocks 152 and 158 whether it is time to apply or remove coil voltage to or from the right front relay 28 and if not, the microprocessor 66 determines at blocks 164 and 170 whether it is time to apply or remove coil voltage to or from the right rear relay 30. If the microprocessor 66 determines at one of blocks 140, 152 or 164 that coil voltage is to be applied to either the left rear relay 26, right front relay 28 or right rear relay 30, the microprocessor 66, at respective blocks 142, 154 or 166, control the relay driver 129 to apply coil voltage to the relay. Thereafter, at blocks 144, 156 and 168, the microprocessor 66 starts timing. If the microprocessor 66 determines at blocks 146, 158 or 170 that it is time to remove coil voltage from the left rear relay 26, the right front relay 28 or the right rear relay 30, the microprocessor 66 at respective blocks 148, 160 or 172 controls the relay driver 129 to remove the coil voltage from the relay. Thereafter, at blocks 150, 162 or 174, the microprocessor 66 starts timing.

After a relay is energized or deenergized by the application or removal of coil voltage, the timer 78 counts up until an external interrupt INT 2 is received by the microprocessor 66 as discussed with reference to FIG. 6 or until the timer has exceeded 50 milliseconds, as determined by the subroutine depicted in FIG. 5. Periodically, in the main program controlling the cooking appliance 10, the microprocessor 66 enters the subroutine depicted in FIG. 5 to determine at block 176 whether the timer 78 has exceeded 50 milliseconds. A count in the timer 78 greater than 50 milliseconds indicates that an arc has not been produced upon a change of state of a relay so that the timer 78 may be reset. The delay constant previously used is not changed since switching of the relay contacts took place at the desired time. If the microprocessor 66 determines that the contents of the timer is greater than 50 milliseconds, the microprocessor 66 stops the timer 78 at block 178 and resets the timer busy flag to indicate that the timer 78 is no longer in use. If an arc does occur before the timer 78 reaches 50 milliseconds such that an external interrupt INT 2 is generated, the microprocessor 66 calculates a new delay constant as shown in FIG. 6.

Upon receipt of an external interrupt INT 2 identifying the occurrence of an arc upon a state change of a relay, the microprocessor 66 stops the timer 78 at block 180 shown in FIG. 6. At block 182, the microprocessor 66 resets the timer busy flag. Thereafter, the microprocessor 66 determines at blocks 184–192 which relay produced the arc and whether the arc was produced upon the closing or the opening of the relay contact assembly. Upon determining which relay generated the arc and whether it was generated upon the opening or closing of the relay's contact assembly, the microprocessor 66 at one of the appropriate blocks 194, 195, 196, 197, 198, 199, 200 or 202 calculates a new delay constant and at a respective block 203, 204, 205, 206, 207, 208, 209 or 210 stores the newly calculated delay constant in the RAM 85 at a location associated with the turn on or turn off delay constant for the particular relay.

Figure 7:
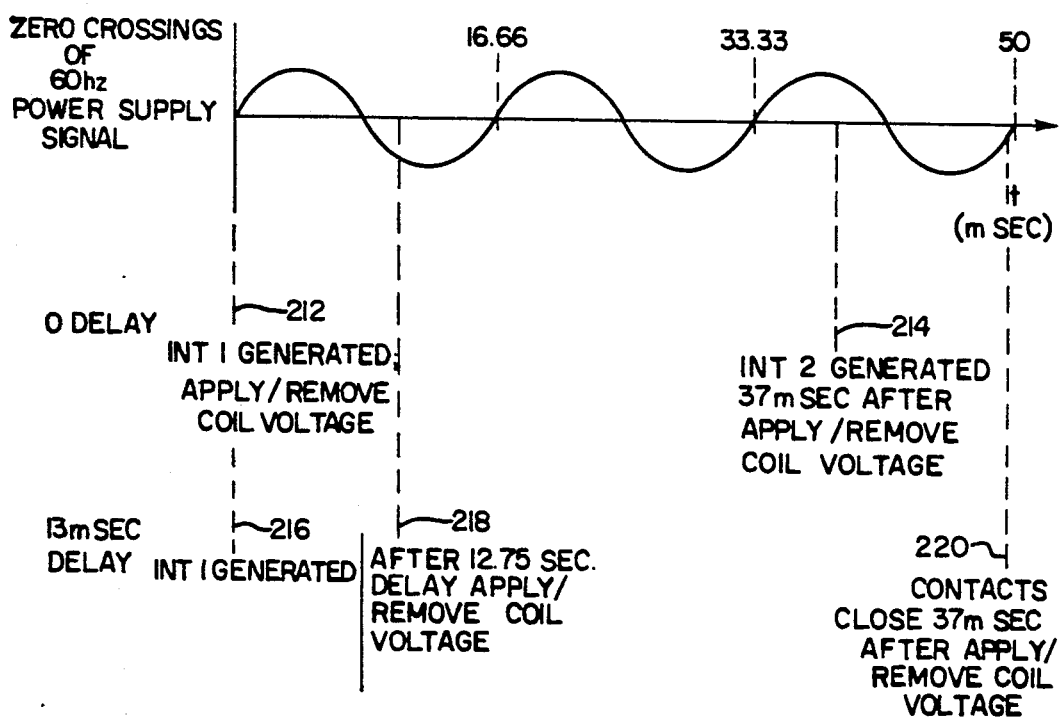
FIG. 7 depicts a timing chart illustrating the operation of the relay control of the present invention.

A new delay constant is calculated by the microprocessor 66 at blocks 194–202 by subtracting the contents of the timer 78 representing the relay delay from 49.75 milliseconds to cause the relay to subsequently change state at or slightly before a zero crossing point of the power supply signal. The value 49.75 milliseconds used to calculate a new delay constant is chosen because it is one count of the timer 78, i.e., 0.25 milliseconds, prior to the zero crossover point of the power supply signal at 50 milliseconds, wherein 50 milliseconds represents a multiple of the power supply signal's period, T. More specifically, as shown in FIG. 7, the first zero crossover point of the 60 Hz power supply signal in going from a positive half cycle to a negative half cycle occurs at approximately 16.66 milliseconds; and the second zero crossover point occurs at 33.33 milliseconds. Since the resolution of the timer 78 is not sufficient to determine exactly when the first and second zero crossover points occur, the third crossover point at 50 milliseconds is used to determine the delay constant. Further, because an arc will occur if the contact assembly of a relay opens or closes slightly after a zero crossover point of the power supply signal, it is desirable to have the contacts close or open one count or 0.25 milliseconds prior to the zero crossover point. Therefore, the new delay constant is set equal to 50 milliseconds minus 0.25 milliseconds minus the time in the timer 78 when the external interrupt INT 2 is received indicating that an arc is sensed, i.e., 49.75 milliseconds minus the contents of the timer 78 at the time the external interrupt INT 2 is received by the microprocessor 66. More generally, the delay constant is set equal to the difference between (mT-x) and the relay delay where m is an integer such as 3, T is the period of the power supply signal such as 16.66, and x is a constant, such as 0.25, substantially less than the period T.

An example of how the microprocessor 66 responds to the receipt of external interrupts, INT 1 and INT 2, and the internal timer interrupt from the timer 78 will now be described with reference to FIGS. 3, 4, 6 and 7 wherein it is assumed for the example that the left front relay 24 is to be turned on.

Upon receipt of an external interrupt INT 1 from the zero crossover detector 70 indicating a zero crossover point going from a negative half cycle of the power supply signal to the positive half cycle as shown at time 212 (FIG. 7), the microprocessor 66 at block 82 determines whether there is a request for the left front relay 24 to turn on if the timer 78 is not already busy. Assuming there is such a request, the microprocessor 66 at block 84 transfers the left front relay turn on delay constant from the RAM 85 into the timer 78. At block 86 the microprocessor 66 starts the timer 78 counting up and sets the timer busy flag. Assuming that the turn on delay constant stored in RAM 85 for the relay 24 is zero, the internal timer interrupt is generated immediately causing the microprocessor 66 at block 128 to control the relay driver 129 to apply the coil voltage to the left front relay 24 at approximately the same time that the external interrupt INT 1 is generated, i.e., time 212. At the same time, time 212, the microprocessor 66, at block 130, starts the timer 78 counting up from zero. If an arc occurs 37 milliseconds after applying voltage to the coil 32 of the left front relay 24, causing at time 214 an external interrupt INT 2 to be generated, as shown in FIG. 7, the microprocessor 6 at block 184 determines that the left front relay was closed generating the arc. At block 194 the microprocessor 66 calculates a new turn on delay constant for the left front relay 24. More specifically, at block 194 the new delay constant is calculated by subtracting the contents of the timer at the time the external interrupt INT 2 is generated, i.e., 37 milliseconds, from 49.75 milliseconds, this difference representing a new delay constant of 12.75 milliseconds. At block 203, the microprocessor 66 stores the new turn on delay constant in the RAM 85 for the relay 24. Subsequently, when an external interrupt INT 1 is generated, as shown in FIG. 7 at 216, and there is a request for the left front relay to turn on as determined by the microprocessor 66 at block 82, the microprocessor 66 transfers the 12.75 millisecond relay turn on delay constant from the RAM 85 into the timer 78 at block 84 and starts the timer 78 at block 86. 12.75 milliseconds after the external interrupt INT 1 is generated, time 218 shown in FIG. 7, the timer 78 reaches zero generating the internal timer interrupt to cause the microprocessor 66 to proceed to block 126. At block 126 the microprocessor 66 determines that it is time to apply coil voltage to the left front relay 24 and at block 128 controls the relay driver 129 to apply the coil voltage to the relay 24. At block 130, the microprocessor starts the internal timer 78 counting up from zero. 37 milliseconds after the application of coil voltage to the relay 24, the relay contact assembly 40 changes state at the 50 millisecond zero crossover point if there has been a processing delay of one count, or slightly, i.e., 0.25 milliseconds, therebefore.

Alternative sensors for detecting arcing in accordance with the present invention are shown in FIGS. 8 and 9 for a double pole electromagnetic relay 232 coupling a 240 V AC power supply signal to a heating element 234 when a voltage is applied to the coil 236 by the relay driver 238. As shown in FIG. 8, an electromagnetic or RF pickup coil 240 is positioned adjacent to a housing 242 for the relay 232 in order to pick up the electromagnetic signal in the radio frequency (RF) range radiated from an arc occurring when the relay 232 is opened or closed at other than a zero crossover point of the power supply signal. The pickup coil 240 is coupled to interface circuitry 244 including a comparator and amplifier for comparing the output of the coil 240 to a threshold level to provide a logic level output signal of sufficient magnitude to form the external interrupt, INT 2, when the coil output is greater than the threshold level. One advantage of this sensor over an optical sensor is that the housing 242, while preferably formed from a non-ferromagnetic material so as not to interfere with the detection of the electromagnetic or RF signal caused by arcing, need not be made of a clear material. Further, the relay assembly of FIG. 8 need not be shielded from ambient light.

Another alternative sensor, as shown in FIG. 9, includes a piezoelectric transducer 246 positioned on or adjacent to the housing 242 for the relay 232 in order to pick up vibrations generated upon the closing or opening of the relay 232. Upon closing of the relay, vibrations are generated as the relay contacts connect, the vibrations being sensed by the transducer 246 which, in response thereto, outputs a signal to the interface circuitry 244. When the relay contacts open, vibration is not produced instantly, but is delayed until the relay armature strikes its stop. This delay, however, may easily be compensated for by the microprocessor 66.

Alternative methods of calculating the delay constant are further depicted in FIGS. 10 and 11. When the external interrupt INT 2 is generated and the microprocessor 66 identifies the relay that changed state, opening or closing, the microprocessor 66 may calculate a new delay constant using software illustrated in the flow charts of FIGS. 10 and 11. FIG. 10 represents the software implemented for a microprocessor 66, the internal timer 78 of which is capable of generating counts with the time per count being a number that can be divided evenly into 8.33 msec where the power supply signal crosses zero every 8.33 msec. If the time per count of the microprocessor's internal timer 78 is not a number that can be divided evenly into 8.33, the embodiment of the software depicted in FIG. 11 is preferred since errors due to the remainder are substantially averaged out.

As shown in FIG. 10, in order to calculate a new delay constant, the microprocessor 66 at block 250 first increments the timer value representing the relay delay by one count to ensure that the relay will change state at or slightly before a zero crossover point of the power supply signal. At block 252, the microprocessor 66 stores the incremented relay delay value determined at block 250 as the delay value. The microprocessor at block 242 then determines whether the delay value is greater than the count representing 8.33 msec. If not, the microprocessor 66 at block 256 subtracts the delay value from the count value representing 8.33 msec and stores the difference as the new delay constant. If the microprocessor 66 determines at block 254 that the delay value is greater than the count value representing 8.33 msec at block 258, the microprocessor 66 subtracts the count value representing 8.33 msec from the delay value and stores the difference as the delay value. The microprocessor 66 continues to subtract the count value representing 8.33 msec from the delay value until the delay value is determined to be less than the count value representing 8.33 msec, at which point the microprocessor proceeds to block 256 to subtract the delay value from the count value representing 8.33 msec and to store the difference as the new delay constant.

As shown in FIG. 11, in order to calculate the delay constant according to this embodiment, the microprocessor at block 260 first increments the timer value representing the relay delay by one count to ensure that the relay will change state at or slightly before the zero crossover point of the power supply signal. At block 262, the incremented relay delay is stored by the microprocessor 66 as the delay value. Thereafter, at block 264, the microprocessor 66 subtracts the count representing 8.33 msec plus from the delay value and stores the difference as the delay value. The microprocessor 66 then determines at block 266 whether the delay value stored at block 264 is negative. If it is, the microprocessor at block 268 stores the absolute value of the delay value as the new delay constant. If the delay value is positive, the microprocessor at block 270 subtracts the count representing 8.33 msec minus from the delay value and stores the difference as the delay value. The microprocessor continues to subtract the count representing 8.33 msec plus at block 264 and the count representing 8.33 msec minus from the delay value until it becomes negative as determined at block 266 or block 272 at which time the microprocessor proceeds to block 268 to store the absolute value of the delay value as the new delay constant. In this embodiment 8.33 msec corresponds to a point somewhere between one count and the next count so that the count representing 8.33 msec minus is that one count and the count representing 8.33 plus is the next count after that one count. When 8.33 msec corresponds to a point half-way between the one and next count, the software illustrated in FIG. 11 averages out the error due to the remainder of 8.33 msec divided by the time per count. Even if 8.33 msec corresponds to some point between the one and the next count, but not half-way between, the software illustrated in FIG. 11 will substantially eliminate the error due to the remainder.

Many modifications and variations of the present invention are possible in light of the above teachings. For example, while the invention as illustrated herein is used to control a relay that is connected to a power source that produces an alternating output, it will be obvious to those skilled in the art that the invention can also be used in association with any power source that produces a periodic waveform that approaches or reaches a zero or minimum magnitude. In particular, the invention disclosed herein may be used to control a relay that is energized from a full wave rectified AC signal. Thus, it is to be understood that, within the scope of the appended claims, the invention may be practiced otherwise than as described hereinabove.

What is claimed and desired to be secured by Letters Patent is:

1. A contact arc sensing relay assembly comprising:
   a housing;
   an electromagnetic relay mounted in said housing, said relay having at least one pair of contacts having open and closed positions; and
   means disposed in communication with said contacts for sensing arcing between said contacts upon opening thereof when the state of said relay contacts changes, wherein said sensing means provides a signal when arcing between said contacts is detected, said relay assembly further including means for timing the change of state of said contacts in response to said signal.

2. A contact arc sensing relay assembly as recited in claim 1 wherein said sensing means includes optical sensing means for sensing light generated by an arc occurring upon a change of the state of said relay contrasts.

3. A contact arc sensing relay assembly as recited in claim 2 wherein said housing is transparent to the optical wavelength of an arc and said optical sensing means is positioned outside of said housing.

4. A contact arc sensing relay assembly as recited in claim 2 wherein said optical sensing means is mounted in said housing adjacent to said relay.

5. A contact arc sensing relay assembly as recited in claim 2 wherein said optical sensing means comprises a phototransistor.

6. A contact arc sensing relay assembly as recited in claim 1 wherein said sensing means includes means for sensing an electromagnetic or RF signal in the radio frequency (RF) range radiated from an arc occurring upon the change of the state of said relay pole.

7. A contact arc sensing relay assembly as recited in claim 6 wherein said housing is transparent to said RF signal and said sensing means is mounted outside of but within the range of said relay housing so as to pick up said RF signal.

8. A contact arc sensing relay assembly as recited in claim 1 wherein said contacts are surrounded by air.

9. A relay assembly comprising:
   a housing;
   an electromagnetic relay mounted in said housing, said relay having at least one contact assembly selectively movable between open and closed positions; and means positioned with respect to said relay for detecting the movement of said contact assembly and providing an indication thereof, said movement detecting means including means for sensing vibration generated by said contact assembly when the state of said contact assembly changes from said open position to said closed position.

10. A relay assembly as recited in claim 9 wherein said sensing means includes a piezoelectric transducer.

11. A relay assembly as recited in claim 10 wherein said piezoelectric transducer is positioned outside of said housing.

12. A relay assembly as recited in claim 10 wherein said piezoelectric transducer is mounted in said housing adjacent to said relay.

* * * * *